Patented Jan. 10, 1950

2,494,084

UNITED STATES PATENT OFFICE 2,494,084

BARBITURIC ACID DERIVATIVES AND PROCESS FOR PREPARING THEM

William F. Bruce, Havertown, Pa., George Mueller, Knoxville, Tenn., and Joseph Seifter, Willow Grove, and Joseph Lester Szabo, Drexel Hill, Pa., assignors to Wyeth Incorporated, Philadelphia, Pa., a corporation of Delaware No Drawing. Application June 28, 1947, Serial No. 757,922

13 Claims. (Cl. 260—257)

This invention relates to new barbituric and thiobarbituric acid derivatives and methods for preparing them. More particularly, the invention relates to methods for preparing barbituric and thiobarbituric acid derivatives having an alphacyclo-propylethyl radical and an alkyl, alicyclic, alicyclicalkyl or alkenyl radical attached to the 5-carbon atom of the barbituric or thiobarbituric ring; and to specific barbituric and thiobarbituric compounds.

The compounds made in accordance with the disclosed methods may be represented by the structural formula:

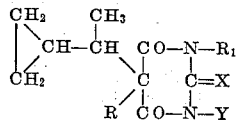

where R is an alkyl radical of 2 to 5 carbon atoms, an alicyclic radical of 3 to 5 carbon atoms, an alicyclicalkyl radical of 4 to 5 carbon atoms, or an alkenyl radical having 3 to 5 carbon atoms, $R_1$ is H or an alkyl radical of 1 to 2 carbon atoms, X represents O or S and Y represents a member of the group consisting of hydrogen, an alkali metal, an alkaline earth metal, ammonium, or in fact, any salt of an organic base such as alkyl ammonium or dialkyl ammonium.

The new compounds of the invention are useful pharmacologically as anesthetics, sedatives, anticonvulsants, soporifics and hypnotics, some of these displaying a relatively fast action of comparative short duration while others possess an action of relatively long duration, which properties render the new compounds suitable for specific therapeutic purposes.

In accordance with the present invention, the new barbituric or thiobarbituric acids are obtainable by reducing methyl cyclopropyl ketone to form 1-cyclopropyl-ethanol-1. The latter product is treated with a suitable halide to form 1-cyclopropyl 1-halo-ethane which is then reacted with a suitable alkali metal malonic ester as represented by the general formula:

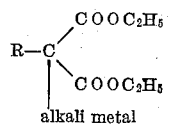

to form

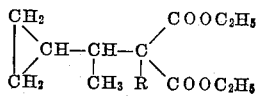

where R represents the radicals indicated hereinabove. This product is then condensed with urea, guanidine, thiourea or the mono-N-alkylated derivatives of these to form the 5-alpha-cyclopropylethyl - 5 - alkyl, - alicyclic, - alicyclicalkyl or -alkenyl barbituric or thiobarbituric acid derivatives.

The first reduction step of methylcyclopropyl ketone to form the alcohol is carried out either by a hydrogenation in the presence of a suitable hydrogenation catalyst; or by reducing said ketone with aluminum isopropoxide in the presence of isopropyl alcohol. A reduction wherein hydrogen is formed in situ, as for example, by the use of sodium in the presence of ethanol, has been found to give low yields due to unavoidable opening of the alicyclic ring. It has been found that while known hydrogenation catalysts are in general operable, the yields vary depending on the catalysts selected. For example, both nickel and palladium will reduce the ketone but the yields are relatively low due to the fact that the alicyclic ring is opened to a considerable extent. On the other hand, excellent results have been obtained with platinum catalysts. The hydrogenation is carried out at about room temperature and at a pressure of about 60 p. s. i. initially. The reaction is, of course, exothermic and the temperature is permitted to rise while the pressure during the reaction may range from the initial pressure to about 10 p. s. i.

Following the reduction of the ketone to cyclopropylethanol, the hydroxy radical is replaced by a halogen, the alcohol being treated with dry hydrogen halide such as hydrogen chloride, hydrogen bromide or hydrogen iodide; or with thionyl chloride; or with hydrogen chloride or bromide in the presence of sulfuric acid or zinc chloride; or with phosphorous tri- or pentachloride. It has been noted that when HBr is used, the operation is best carried out at a temperature of —50° to —80° C. in order to avoid opening the ring. At higher temperatures, such as 0° C., the alicyclic ring is opened and the yields are correspondingly low. The preferred halide in all cases is the chloride and the preferred reagent is dry hydrogen chloride which has been found to give the best results since the reaction is not influenced by the temperature of operation which may range from —60° C. to 25° C.

The halide product produced in the above step is then reacted with the diethyl ester of the alkali metal derivative of the alkyl, alicyclic, alicyclicalkyl or alkenyl substituted malonic acid, in the presence of a suitable solvent. It has been found that while polar or non-polar solvents may be used, the yield of the desired product varies in accordance with the solvent selected. Thus, the non-polar solvents such as benzene and toluene and the polar solvent such as diethyl ether give high yields while ethyl alcohol as a solvent has been found to give low yields due to side reactions. The preferred solvent for this reaction is benzene. The resulting product as stated before is then condensed with urea, guanidine, thiourea or the mono-N-alkylated derivatives of these, depending on the product desired.

The invention is further illustrated by the following examples but it is to be understood that these examples are not to be considered limitative of the invention.

EXAMPLE I

*Reduction of methyl cyclopropyl ketone to methyl cyclopropyl carbinol, method No. 1*

Methyl cyclopropyl ketone (42 grams) was reduced with hydrogen in the presence of 0.4 gram of platinum oxide at room temperature and under 60 lbs. per square inch hydrogen pressure. After about 4.5 hours, the reaction products were removed and filtered to separate out the catalyst. On distillation, methyl cyclopropyl carbinol was collected at 121–122° C.; $n_D^{20} = 1.4305$.

EXAMPLE II

*Reduction of methyl cyclopropyl ketone to methyl cyclopropyl carbinol, method No. 2*

To 1800 cc. isopropanol, which had been dried and distilled over calcium oxide, 81 g. aluminum and 15 g. mercuric chloride were added. The mixture was heated until reaction began and then heat removed until the rate of reflux became constant; and was heated under reflux for 21 hrs. The reaction flask was then fitted with a modified Hahn condenser so arranged as to have a water condenser at the top and a downward water condenser at the side arm. A 60–40 mixture of isopropanol-acetone was added to the inner tube of the Hahn condenser. 252 g. (3 m.) methyl cyclopropyl ketone was added dropwise and the temperature of the reaction held at a point to maintain a rate of distillation of one drop every 1½ to 2 minutes. The distillation was continued until test for acetone was negative, or about 62 hours. The mixture was then chilled in an ice bath and acidified with 450 g. $H_2SO_4$ in 2 kg. chopped ice. The oily layer was separated and the aqueous layer was extracted three times with ether. The ether and oily layers were combined and washed with saturated NaCl solution, dried over $Na_2SO_4$; filtered and concentrated. The fractionated product boiled at 121–123°, $n_D^{20} = 1.4315$.

The alcohol obtained from either catalytic reduction or aluminum isopropoxide reduction of methyl cyclopropyl ketone was found to yield the N-phenylcarbonate melting at 70–71° C. (Beilstein, 70° C.). Analysis: N, calculated 6.83; found, 6.70.

EXAMPLE III

*Preparation of 1-cyclopropylethyl halides*

To 5 grams of 1-cyclopropylethanol-1 cooled to −80° C., approximately 3 cc. of liquid hydrogen bromide was added. After standing in a Dry Ice bath overnight, the product containing some water from the reaction was distilled directly. On redistillation of appropriate fractions, 1-cyclopropyl-1-bromoethane was obtained which boiled at 57–58° C. at a pressure of 70 mm.; $n_D^{20}$ 1.4702;

$$d_{23}^{23} 1.2818$$

Bromine, calculated 53.5; found, 53.3.

To 5 grams of 1-cyclopropylethanol-1 there was added 0.62 gram of red phosphorus (washed with water, alcohol and dried at 100° C. in vacuum). To this mixture, 7.3 grams of powdered iodine was added in small portions. After the addition, the product was distilled, obtaining a fraction boiling at 38–39° C. at a pressure of 8 mm. This fraction was placed in the refrigerator over mercury until colorless and was again distilled, yielding 1-cyclopropyl-1-iodoethane boiling at 44° C. at a pressure of 3 mm., $n_D^{21.5}$ 1.5209. Iodine, calculated, 64.8; found 63.8.

The iodide was also prepared by metathesis from 1-cyclopropyl-1-chloroethane by the use of sodium iodide. The chloride (0.2 mol) was treated with 0.2 mol sodium iodide in acetone and refluxed overnight. The sodium chloride was then filtered off, the solvent removed and the residue fractionated. Boiling point 46.5° C. at a pressure of 12 mm., $n_D^{20}$ 1.5226.

For the preparation of the chloride, 1-cyclopropylethanol-1 (0.2 mol) was cooled in an ice bath and a rapid stream of hydrogen chloride gas was passed through it. The alcohol rapidly became turbid due to the separation of water and the absorption of hydrogen chloride became slower. When complete saturation had been reached, two layers formed. The lower acid layer was removed and the organic layer was washed well with ice water, dried over calcium chloride and distilled. The desired fraction of 1-cyclopropyl-1-chloroethane boiled at 104.5° C. at a pressure of 767 mm., $n_D^{20}$ 1.4322, $$d_{21}^{21} 0.9390$$

EXAMPLE IV

*Preparation of diethyl cyclopropylmethylcarbinyl-allyl-malonate*

In a 3-necked 100 ml. flask, 2.3 grams of sodium was dissolved in 30 cc. of absolute alcohol and 0.1 mol (20 grams) of diethyl-allylmalonate was added. This was followed by 15.7 g. of 1-cyclopropyl-1-bromoethane. Heating and stirring were continued for one hour, after which a large proportion of the alcohol was distilled in vacuo. The residue was washed with water, neutralized, dried, and distilled. The diethyl cyclopropylmethylcarbinyl allylmalonate boiled from 129–132° C. at a pressure of 4.8 mm.; $n_D^{20}$ 1.4528. Analysis: calculated for $C_{15}H_{24}O_4$—C, 67.13, H, 9.02; found: C, 67.05, H, 8.91.

EXAMPLE V

*Preparation of diethyl cyclopropylmethylcarbinylethyl-malonate*

To a 500 cc. flask containing 100 cc. of dry benzene and 4.6 g. of sodium, 75.2 g. of dry diethylethyl-malonate was slowly added with stirring. The sodium gradually dissolved with evolution of hydrogen over a periiod of 2 hrs., with heating. After cooling the solution to room temperature, 26.3 g. of 1-cyclopropyl-1-chloroethane was added rapidly, and the liquid was heated to reflux, at which point deposition of sodium chloride began. After stirring and refluxing for 24 hrs., the mixture was cooled, washed with water and neutralized, concentrated in vacuo and distilled. The product boiled at 104–8° C. at 2.5 mm. $n_D^{20}$ 1.4455.

$d_4^{21}$ 1.0140 identical with the product secured by a similar reaction done in absolute ethanol and analyzed: Calculated for $C_{14}H_{24}O_4$—C, 65.59; H, 9.44. Found: C, 64.75; H, 9.72; $n_D^{20}$ 1.4452

$d_4^{21}$ 1.0140

The above reaction proceeds similarly when using the bromide instead of the chloride and although benzene is preferred as a solvent, other non-polar solvents such as toluene may be substituted therefor if desired. Among the polar solvents, ethyl ether has also been found useful.

EXAMPLE VI

*Preparation of 5-cyclopropylmethylcarbinyl-5-allyl-barbituric acid*

Using oven-dried glassware and ethanol rendered absolute over sodium and ethyl phthalate, a solution of sodium ethylate was prepared by dissolving 1.35 g. (0.0586 mol) of clean sodium metal in 30 cc. of alcohol. The reaction was protected from moisture by a calcium chloride tube. Diethyl cyclopropylmethylcarbinyl - allyl - malonate, 7.85 g. (0.0293 mol), and dried, powdered urea, 1.92 g. (0.032 mol) were then added and dissolved by brief shaking. The reaction mixture was heated on the steam bath; a flocculent precipitate began to appear after 15 minutes. Heating was continued during 20 hours. The alcohol solvent was removed in vacuo while continuing the heating and the dry residue cooled and dissolved in 30 cc. of water. An undissolved oily substance was present. This was removed by washing the aqueous layer with four 20 cc. portions of ether. The aqueous layer was evacuated to remove dissolved ether and acidified with acetic acid. The precipitated gum was collected in four 20 cc. portions of ether and this solution dried and evaporated. The crude oil was precipitated from dry-ether solution as a sodium salt by the calculated quantity of sodium ethylate in alcohol, and this was in turn dissolved in water, dilute hydrochloric acid being added to liberate the free barbituric acid, which crystallized on standing. The product was recrystallized from ether-hexane mixtures, melting initially at 73.5–82° C. and after a third recrystallization at 80.0–87.0° C.

Analysis: calculated for $C_{12}H_{16}O_3N_2$—C, 61.00; H, 6.83; N, 11.86. Found: C, 61.14; H, 6.70; N, 11.36; 11.42.

EXAMPLE VII

*Preparation of 5-cyclopropylmethylcarbinyl-5-ethyl barbituric acid*

128 grams of the malonate ester (diethyl cyclopropylmethylcarbinyl ethylmalonate) and 60 grams of urea are added to a solution of 34.5 grams of sodium in 900 cc. of dry isopropyl alcohol and refluxed for 48 hours. The products were cooled and filtered with a filter aid. The filtrate is concentrated in vacuum on the water bath. To the concentrate 500 cc. of dry ethyl ether is added. The sodium salt of the barbiturate is thus precipitated. This is collected on a filter and washed with ether. The sodium salt is then dissolved in about 500 cc. of water and acidified with concentrated HCl with cooling to a pH of about 8. At this point a solid precipitate is gradually deposited and is left standing in ice for further precipitation. The precipitate is collected and dried producing a second filtrate. The barbituric acid had a melting point of 161–163° C. (uncorrected). The second filtrate is acidified further to pH 6 and further quantity of less pure barbituric acid was obtained. On recrystallization from a minimum amount of ethyl acetate and hexane, the barbituric acid compound gave a melting point of 164° C. (uncorrected) and 166–166.5° C. (corrected).

Analysis: calculated for $C_{11}H_{16}O_3N_2$—C, 58.92; H, 7.14; N, 12.50. Found: C, 58.61; H, 7.46; N, 12.25.

This 5-ethyl barbituric acid is an isomer of the 5-ethyl barbituric acid produced in accordance with the method disclosed in co-pending application Ser. No. 717,806 of Opie et al.

EXAMPLE VIII

*Preparation of 5-alpha-cyclopropylethyl-5-n-propyl-barbituric acid*

A solution of 1.55 grams of 5-alpha-cyclopropylethyl-5-allyl-barbituric acid melting at 142–144° C., in 10 cc. of methanol with 0.1 gram of patinum oxide was shaken with hydrogen at atmospheric pressure. The theoretical amount of hydrogen (168 cc.) required by the organic material plus that required by the catalyst (22 cc.) was absorbed in 35 minutes after which little, if any, further absorption occurred. The catalyst was filtered out; the filtrate was concentrated in vacuo on a water bath. The glassy colorless residue was taken up in hexane containing 5% ethyl acetate. On standing, crystals appeared melting at 110–113° C. On recrystallization from 50% methanol, and drying over acetone and then water in a Fischer pistol, the product melted sharply at 114° C.

Analysis: calculated for $C_{12}H_{18}N_2O_3$—C, 60.48; H, 7.61; N, 11.76. Found: C, 60.48; H, 7.73; N, 11.84.

EXAMPLE IX

*Preparation of 5-alpha-cyclopropylethyl-5-ethyl thiobarbituric acid and its sodium salt*

To a solution of 3.45 grams of sodium in 60 cc. of absolute alcohol was added 12.8 grams of alpha-cyclopropylethylethyl malonic diethyl ester and 7.6 grams of thiourea. The solution was refluxed for 36 hours, cooled and filtered. The precipitate which formed was dissolved in water and acidified. The precipitate from this operation was dissolved in 10% sodium hydroxide, filtered to remove a small amount of sulfur and dissolved in alkali and reprecipitated. The product melted at 126–8° C. Upon recrystallization twice from 10% methanol in water, it melted at 145–6° C. From the filtrate of the original reaction mixture on concentration in a vacuum and addition of 10 cc. of 10% sodium hydroxide 4.5 grams of unchanged ester was extracted from the alkaline mixture. The aqueous solution on acidification and extraction with ether gave 3 grams of oil which crystallized on addition of ether-petroleum ether to give the same compound above described.

Analysis: calculated for $C_{11}H_{16}N_2O_2S$—N, 11.66; S, 13.34. Found N, 11.70; S, 13.64.

EXAMPLE X

*Preparation of 5-allyl-5-alpha-cyclopropylethyl-thiobarbituric acid*

A solution of 6.9 grams of sodium in 90 cc. of absolute isopropyl alcohol was refluxed for 43 hours with 19 grams of thiourea and 26 grams of diethyl cyclopropylmethylcarbinyl-allyl-malonate (as prepared in Example IV). The solid which formed was collected on a filter. The filtrate was concentrated in vacuo; the residue dissolved in a small amount of water and the water was extracted repeatedly by ether to remove unchanged malonate. The water solution was acidified and extracted repeatedly with ether. The ether solution was distilled to evaporate the ether and an oil was obtained. This was dissolved in an equal volume of ethyl acetate and hexane (66–68° C.) was added to incipient cloudiness. On standing, crystals of 5-allyl-5-alpha-cyclopropylethyl-thiobarbituric acid were obtained which, after four crystallizations from the same solvents, melted at 139° C.

Analysis: calculated for C12H16N2O2S—C, 57.15; H, 6.39; N, 11.12; S, 12.71. Found: C, 57.37; H, 6.47; N, 11.18; S, 12.73.

EXAMPLE XI

*Preparation of the barbituric and thiobarbituric acid salts*

The salts of the new barbituric and thiobarbituric acid derivatives are obtained by neutralizing with bases in the well-known manner, as for example, with alkali metal hydroxide or alcoholate, alkaline earth metal hydroxide or alcoholate, an aqueous or alcoholic solution of concentrated ammonia or with an alkylamine such as methyl or ethyl amine or with a dialkyl amine such as dimethyl- or diethylamine. The following procedure illustrates the formation of the sodium salt. Other salts may be prepared in the same manner as illustrated in co-pending application, Ser. No. 717,806 of Opie et al.

Sodium salt: one gram of 5-cyclopropylmethylcarbinyl-5-allylbarbituric acid was dissolved in 2.5 cc. (0.00423 mol) of a sodium ethylate solution and the sodium salt was then precipitated by the addition of anhydrous ether. The precipitate was white and fluffy, the yield being 96% of theoretical.

We claim:

1. A barbituric compound represented by the general following formula

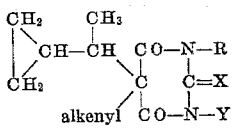

in which alkenyl in the formula represents an alkenyl radical having from 3 to 5 carbon atoms, where R is a member of the group consisting of hydrogen and an alkyl having 1 to 2 carbon atoms in the molecule, X is a member of the group consisting of O and S; and Y represents a member of the group consisting of hydrogen, an alkali metal, an alkaline earth metal, ammonium, alkyl-ammonium and dialkylammonium.

2. A barbituric compound represented by the formula

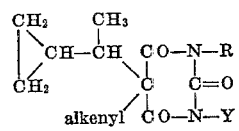

in which alkenyl in the formula represents an alkenyl radical having from 3 to 5 carbon atoms, where R is a member of the group consisting of hydrogen and an alkyl having 1 to 2 carbon atoms in the molecule and Y represents a member of the group consisting of hydrogen, an alkali metal, an alkaline earth metal, ammonium, alkylammonium and dialkylammonium.

3. A barbituric compound represented by the formula

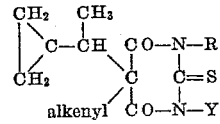

in which alkenyl in the formula represents an alkenyl radical having from 3 to 5 carbon atoms, where R is a member of the group consisting of hydrogen and an alkyl having 1 to 2 carbon atoms in the molecule; and Y represents a member of the group consisting of hydrogen, an alkali metal, an alkaline earth metal, ammonium, alkylammonium and dialkylammonium.

4. A barbituric compound represented by the formula

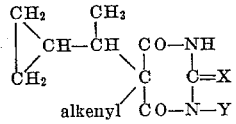

in which alkenyl in the formula represents an alkenyl radical having from 3 to 5 carbon atoms, where X is a member of the group consisting of O and S and Y represents a member of the group consisting of hydrogen, an alkali metal, an alkaline earth metal, ammonium, alkylammonium and dialkylammonium.

5. A barbituric compound represented by the formula

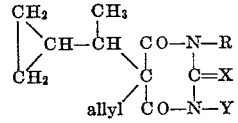

where R is a member of the group consisting of hydrogen and an alkyl having 1 to 2 carbon atoms in the molecule, X is a member of the group consisting of O and S; and Y represents a member of the group consisting of hydrogen, an alkali metal, an alkaline earth metal, ammonium, alkylammonium and dialkylammonium.

6. A barbituric compound represented by the formula

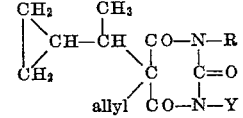

where R is a member of the group consisting of hydrogen and an alkyl having 1 to 2 carbon atoms in the molecule and Y represents a member of the group consisting of hydrogen, an alkali metal, an alkaline earth metal, ammonium, alkylammonium and dialkylammonium.

7. A barbituric compound represented by the formula

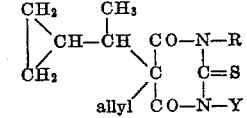

where R is a member of the group consisting of hydrogen and an alkyl having 1 to 2 carbon atoms in the molecule; and Y represents a member of the group consisting of hydrogen, an alkali metal, an alkaline earth metal, ammonium, alkylammonium and dialkylammonium.

8. A barbituric compound represented by the formula

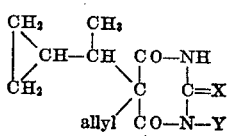

where X is a member of the group consisting of O and S and Y represents a member of the group consisting of hydrogen, an alkali metal, an alkaline earth metal, ammonium, alkylammonium and dialkylammonium.

9. Sodium 5-alpha - cyclopropylethyl - 5 - allyl barbiturate.

10. In the process of preparing a 5-alicyclicalkyl-5-substituted barbituric acid, the steps comprising reducing an alicyclicalkyl ketone to form the corresponding alcohol, reacting the latter compound with a halide to form an alicyclic alkyl halide and alkylating a malonic ester with said halide to form a substituted malonic ester.

11. The process of claim 10, wherein the reducing step is carried out in the presence of hydrogen and a platinum catalyst.

12. The process of claim 10, wherein the halide is a hydrohalide.

13. The process of claim 10, wherein the alkylation is carried out in the presence of a nonpolar organic solvent.

WILLIAM F. BRUCE.
GEORGE MUELLER.
JOSEPH SEIFTER.
JOSEPH LESTER SZABO.

REFERENCES CITED

The following references are of record in the file of this patent:

UNITED STATES PATENTS

| Number | Name | Date |
|---|---|---|
| 2,019,936 | Shonle | Nov. 5, 1935 |

OTHER REFERENCES

Chemical Abstracts 32, 2912 (1938).